R. E. ROSEWARNE.
FRICTION CLUTCH.
APPLICATION FILED MAR. 20, 1911.

1,049,604.

Patented Jan. 7, 1913.

2 SHEETS—SHEET 1.

Witnesses
Jos. F. Collins
J. M. Wynkoop

Inventor,
Richard E. Rosewarne,
By Knight Bros
Attorneys.

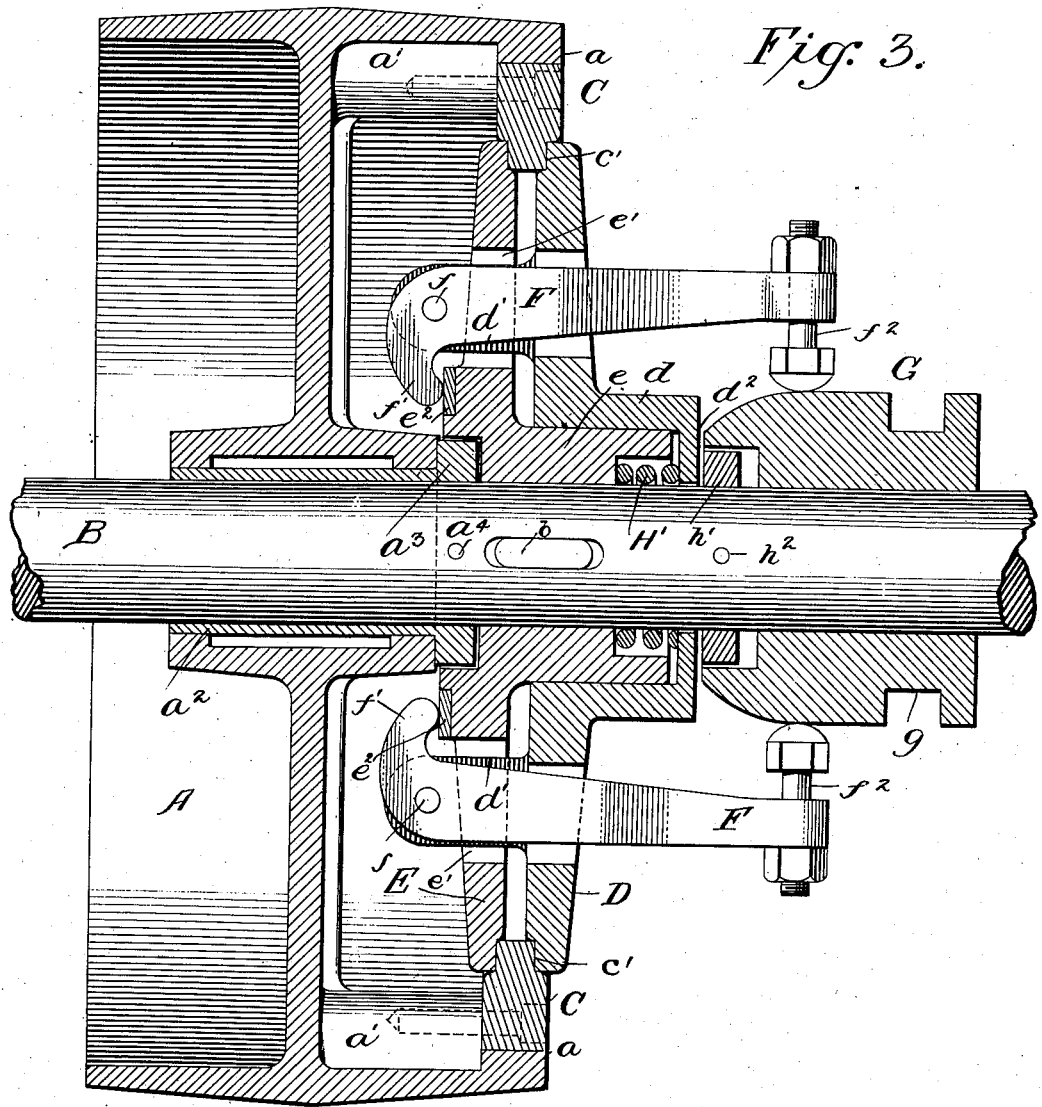

UNITED STATES PATENT OFFICE.

RICHARD E. ROSEWARNE, OF COVINGTON, KENTUCKY, ASSIGNOR TO THE MILLER, DU BRUL & PETERS MANUFACTURING COMPANY, OF CINCINNATI, OHIO, A CORPORATION OF OHIO.

FRICTION-CLUTCH.

1,049,604.  Specification of Letters Patent.  Patented Jan. 7, 1913.

Application filed March 20, 1911. Serial No. 615,581.

*To all whom it may concern:*

Be it known that I, RICHARD E. ROSEWARNE, a citizen of the United States, residing in the city of Covington, county of Kenton, and State of Kentucky, have invented a certain new and useful Friction-Clutch, of which the following is a specification.

This invention relates to a friction clutch for pulleys or driven gears in which it is desired to establish or interrupt, at will, driving connection between a shaft and a transmission member concentric therewith.

Friction clutches depending for efficiency upon pressure exerted against one side of a fixed face, require great force and extensive face contact in order to transmit a certain load without slipping between the faces. Much less power is required to transmit the same load to or from a member having a plurality of faces clamped between two opposed members.

In carrying out my invention, I employ a friction clutch of the clamping type, of simple design, which will be light in construction and require a small operating force relatively to the load transmitting capacity of the clutch.

To these ends, the clutch comprises a pulley or other member to or from which rotation is to be imparted, having an inwardly extending radial flange provided with suitably presented friction faces, preferably, though not necessarily, at an angle that develops wedging action; a shaft upon which said member is loosely mounted and to or from which rotation is to be imparted, a pair of movable clamping flanges having near their outer edges friction faces conforming to those of the flange on the loose member; means for drawing the movable clamping disks together upon the pulley-, or loose-member flange, such, for instance, as levers fulcrumed upon one of the movable flanges and having bearing against the other in a direction to force the movable flanges together and with free ends swung outwardly by means such as a spreading cone; certain features of construction being embodied in the several parts which adapt them to better perform their several functions and insure the efficiency and durability of the device.

The invention consists in novel features hereinafter particularly pointed out in the claims.

Figure 1:
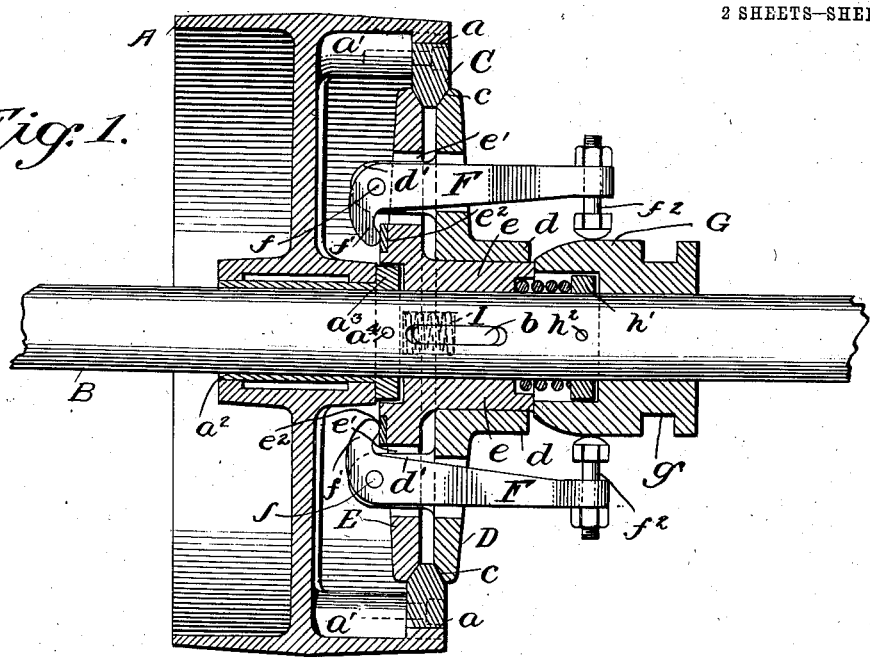
Figure 2:
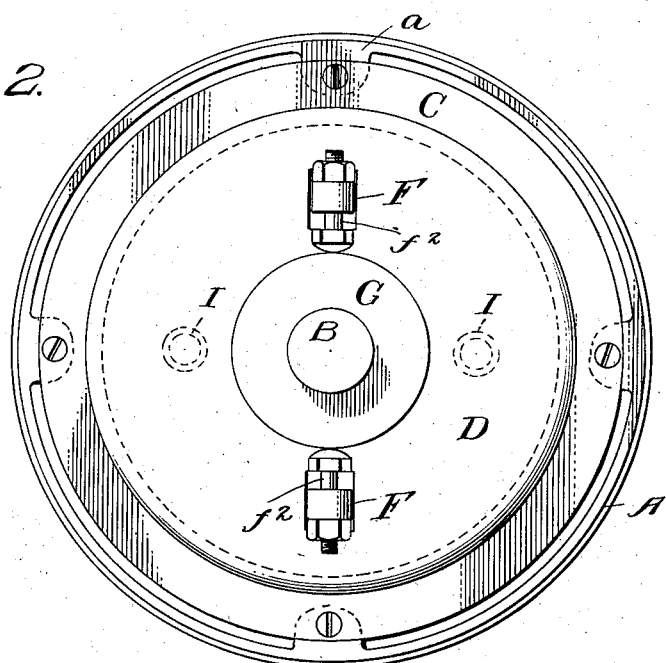

The invention will be fully understood upon reference to the accompanying drawing in which, Figure 1 is an axial section, and Fig. 2 an end view of one embodiment of the clutch; and Fig. 3 is a view similar to Fig. 1, showing a modification of the friction members and their separating spring.

A represents a member (for purposes of illustration shown in the form of a band pulley) with which driving connection is to be established and B represents a driving or driven shaft upon which the member A is loosely mounted through the medium of a bushing $a^2$, having a limiting shoulder $a^3$ and a fixing pin $a^4$.

C represents a flange carried by the loose member (pulley) A and projecting radially inward in position to be clamped; which flange, when said member is in the form of a pulley, may obviously be cast integral with said member A, or may be made separate, of material especially adapted for friction clutch purposes, and conveniently applied so as to be removable when worn, by fitting it to the face $a$ on the pulley and bolting it to bosses $a^1$ of said pulley.

D and E represent movable clamping flanges adapted to be forced toward each other and made to clamp the loose-member flange C between them, by any suitable means. Flange C and flanges D and E have friction faces, by which they contact at any desired angle of presentation, such, for instance, as the square faces shown at $c^1$, $c^1$ in Fig. 3, but they are preferably presented in inclined position as shown at $c$, $c$, Fig. 1, at an angle sufficient to develop some wedging action, yet insufficient to cause binding.

The movable clamping flanges D, E are mounted upon the shaft B by providing one of them, for instance the flange E, with a hub $e$ fitting the shaft B and the other flange (D) with a sleeve $d$, which adapts it to slide upon the hub e. The key b passing through the shaft and entering the hub e, fixes movable flange E against rotation on the shaft B while permitting it to move axially thereon. Movable flange D is non-rotatably but slidably held relatively to flange E, by the projections $d^1$ (also constituting fulcrum ears to be described) on the flange D, projecting through apertures $e^1$ in the flange E. To forcibly set the movable flanges D, E up against the radial flange C, one of said movable flanges, preferably the flange D is provided with pairs of fulcrum ears $d^1$, each of which pairs extends through an opening $e^1$ in the other flange and provides a fulcrum-bearing $f$, for bent fulcrum levers F, working between the ears, and in such position as to permit short ends $f^1$ of said levers to bear against the outer face of the flange E, preferably through the medium of a hardened plate $e^2$, while the long, free ends of the levers F project through both flanges to a point sufficiently distant to develop powerful leverage, and where said levers are provided with adjustable bearing studs $f^2$ extending inwardly to a spreading cone G, against which they bear. The cone G is provided with the usual wrist bearing $g$ for connection with an adjusting arm in a well known manner, and is loosely mounted on the shaft B so that it may be forced axially beneath the lever studs $f^2$ to throw the levers F outward and force the disks together when driving connection is to be established, and withdrawn from beneath said studs and permit levers F to be swung inwardly by the separating movement of the flanges D, E under the reaction of the springs I, when the driving connection is to be interrupted.

In order that the movable flanges may be held out of contact with the radial flange C, when relative rotation is taking place between the said parts, they are provided with resilient spreading means, and stops so limiting their axial movements as to cause them to assume positions spaced, on either side, apart from the radial flange. According to the embodiment shown in Fig. 1, the hub $e$ is normally forced away from flange C, and against the shoulder $a^3$, by means of a spring H, interposed between the hub $e$ and the ring $h^1$ fixed upon the shaft B by means of a pin $h^2$, while the springs I interposed between flanges D and E, force the flange D away from radial flange C, a distance permitted by the levers F.

According to the embodiment shown in Fig. 3, the spring $H^1$, interposed between hub and flange $d^2$ on sleeve $d$, has sufficient expansion to spread the movable flanges till they are arrested respectively by the shoulder $a^3$, and ring $h^1$, which shoulder and ring are so located as to hold the expanded pair spaced on either side of the radial flange.

The operation of the device is as follows:—A shipping lever or controlling arm, engaging in the wrist groove $g$, is thrown in the direction to move the cone G to the position shown in the drawings. This forces the levers F outward, draws the movable flanges D, E together, pressing their friction faces at $c$ or $c^1$ against the corresponding faces of the radial flange, with a resulting friction, much greater than results from merely drawing together two faces. In the form shown in Fig. 1, the friction is developed not simply by the spreading force exerted against the levers F, but also by the wedging angle of the faces $c$. The shaft B will then be in firm driving connection with the pulley A. When the cone G is moved in the opposite direction, the springs H and I, in Fig. 1, or the single spring $H^1$ in Fig. 3 force the flanges D, E away from the flange C. This separation of the flanges throws the free ends of the levers F inward, in position to be impinged against by the cone G when it is again desired to throw the clutch to reëstablish driving connection.

I claim:

1. A friction clutch comprising a pair of radial clamping flanges, a member having a radial flange extending between said clamping flanges, levers for drawing the clamping flanges together upon the intervening radial flange, each lever having a bearing against the outer face of one flange, a fulcrum for each lever extending through the clamping flange against which the lever bears but carried by the opposing clamping flange, and means for swinging the levers radially outward to draw the clamping flanges together upon the intervening flange; the abutting faces of the clamping flanges and the intervening flange being inclined to develop a wedging action in the operation of the clamp.

2. In a friction clutch, the combination of the members between which driving connection is to be established, a radial clamping flange non-rotatably connected to one of said members, means for clamping said radial flange, non-rotatably connected to but axially movable on the other of said members, comprising a pair of opposed movable clamping flanges adapted to be drawn together against faces of the radial flange, clamping levers carried by one of said movable flanges and engaging the other of said movable flanges, means for spreading said levers; and means holding both of said movable clamping flanges out of contact with said radial flange, when the clutch is released, comprising resilient means bearing against one of the movable flanges and having a fixed abutment, and resilient means interposed between the two movable flanges.

3. In a friction clutch having two clamping members adapted to be drawn together upon a third member, means for so drawing together the clamping members, and interlocking them against relative rotation, comprising fulcrums carried by one clamping member and extending in an axial direction through the other clamping member, levers for drawing said clamping members together, mounted upon said fulcrums, and extending through both clamping members, and means for actuating said levers.

The foregoing specification signed at Cincinnati this third day of March, 1911.

RICHARD E. ROSEWARNE.

In presence of—
H. WHYRICH,
W. J. HUNTER.